Oct. 27, 1959

T. D. MADSEN 2,910,332

COMPOSED PACKING RINGS, PARTICULARLY IN PISTON
RINGS FOR INTERNAL COMBUSTION ENGINES

Filed Feb. 28, 1957

INVENTORS
Tage Debusmann Madsen, Deceased
By Ida Dagny Anna Madsen
Kurt Paul Henrik Madsen, Sole Inheritors

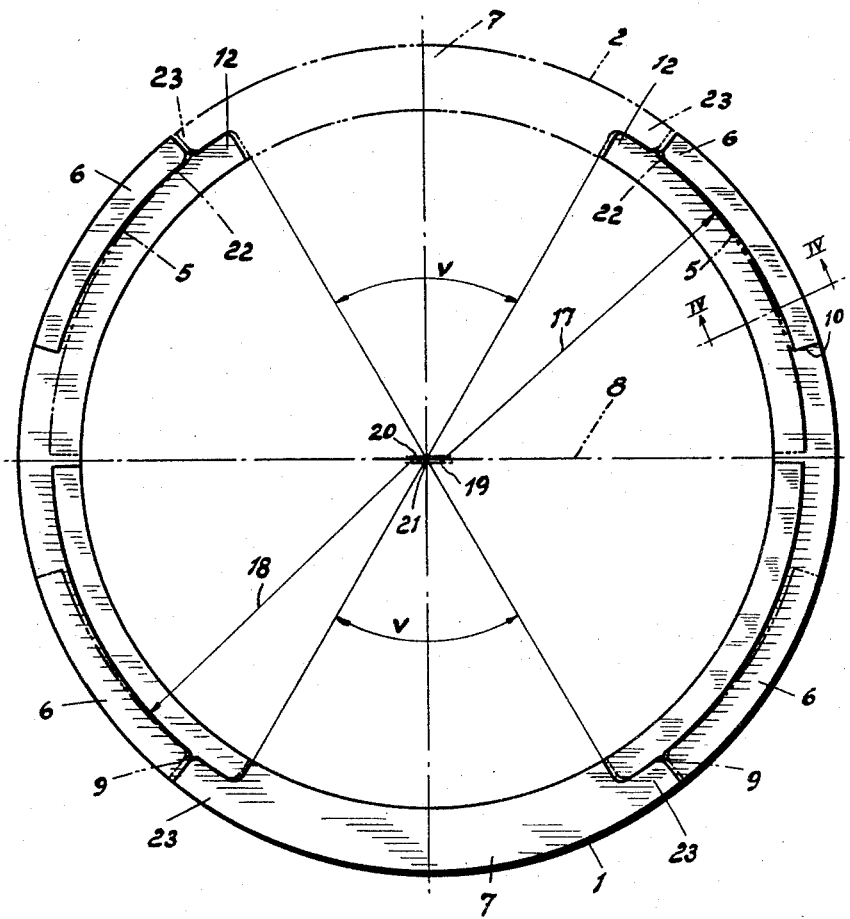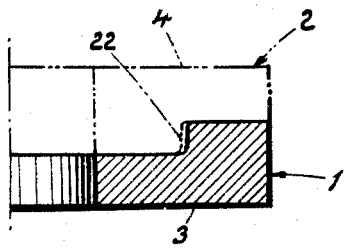

Oct. 27, 1959

T. D. MADSEN 2,910,332

COMPOSED PACKING RINGS, PARTICULARLY IN PISTON
RINGS FOR INTERNAL COMBUSTION ENGINES

Filed Feb. 28, 1957

INVENTORS
Tage Debusmann Madsen, Deceased
By Ida Dagny Anna Madsen
Kurt Paul Henrik Madsen, Sole Inheritors

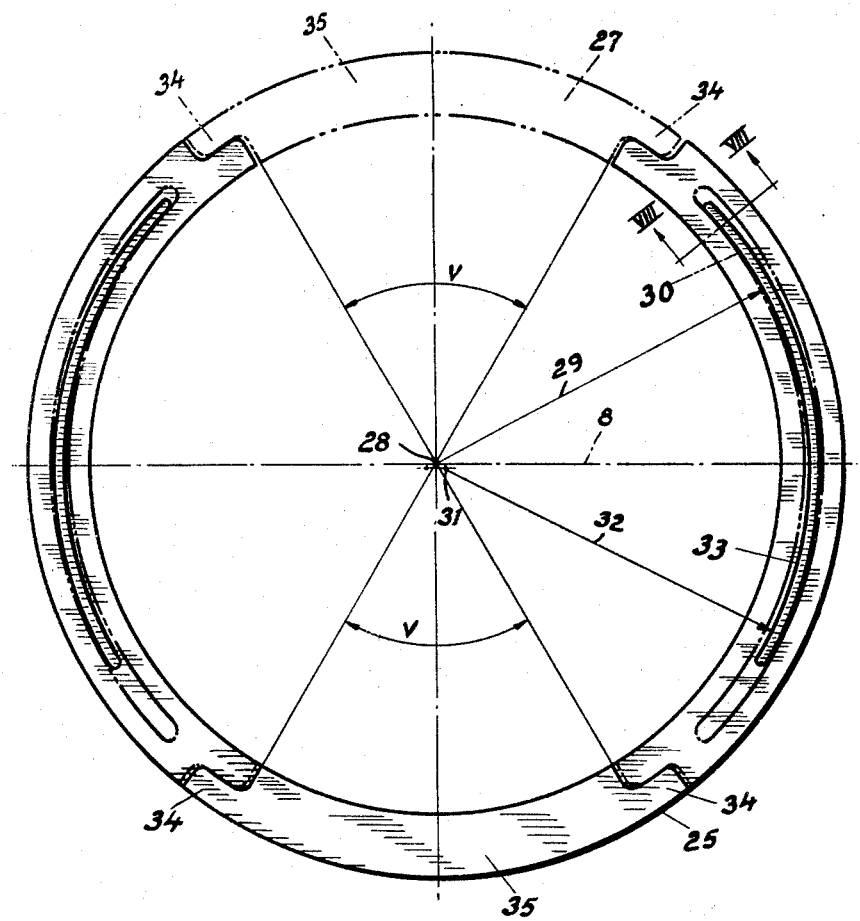
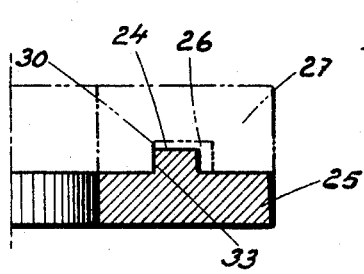
INVENTORS
Tage Debusmann Madsen, Deceased
By Ida Dagny Anna Madsen
Kurt Paul Henrik Madsen, Sole Inheritors

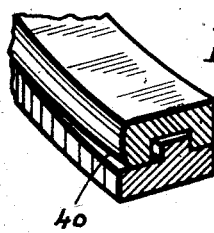
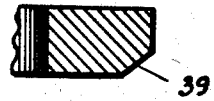
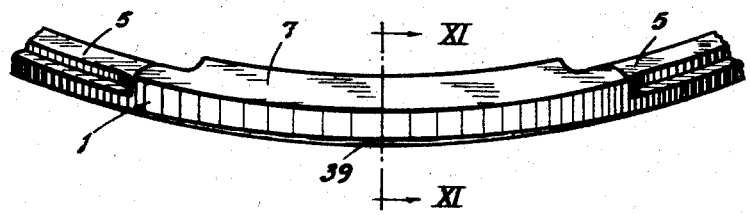
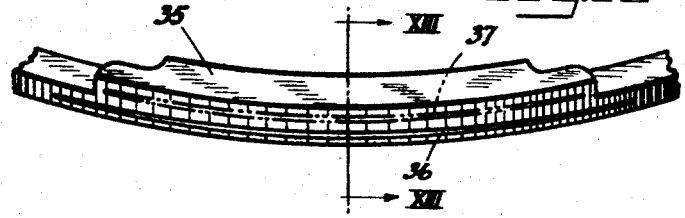
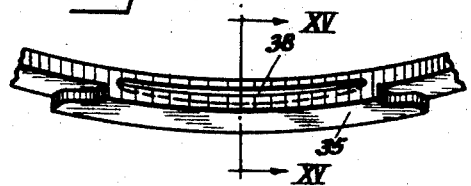
INVENTORS
Tage Debusmann Madsen, Deceased
By Ida Dagny Anna Madsen
Kurt Paul Henrik Madsen, Sole Inheritors

United States Patent Office 2,910,332
Patented Oct. 27, 1959

2,910,332

COMPOSED PACKING RINGS, PARTICULARLY IN PISTON RINGS FOR INTERNAL COMBUSTION ENGINES

Tage Debusmann Madsen, deceased, late of Goteborg, Sweden, by Ida Dagny Anna Madsen and Kurt Paul Henrik Madsen, sole inheritors, Goteborg, Sweden, assignors to Aktiebolaget Davy Robertsons Maskinfabrik, Partille, Sweden, a corporation of Sweden Application February 28, 1957, Serial No. 643,148

Claims priority, application Sweden March 15, 1956

10 Claims. (Cl. 309—44)

This invention relates to improvements in composed packing rings, particularly in piston rings for internal combustion engines.

Many kinds of piston rings are known hitherto which seal against high gas pressure, i.e. piston rings which make it theoretically impossible for the pressure gases to penetrate the radial slot or opening of the piston ring and thereupon to escape to the rear side of the ring. Such rings are either manufactured in one piece or composed of two or several superposed ring segments.

It is also previously known to produce rings comprising two or several ring segments in such a way that the ends of the ring segments situated on both sides of the slot of the piston ring do not spring outwards beyond a circumference corresponding to the inner diameter of the cylinder, for instance, when passing over the gates in the cylinder of a two-stroke engine. Such a resilience is prevented by giving the ring segment a form corresponding ring segment cooperating with the other form in question. According to another embodiment, it is previously known to prevent the ends of one of the ring segments from springing inwards due to the gas pressure against the packing surface of the ring. In this case, too, the resilience is limited by a corresponding stop member on the other ring segment.

Finally, it is also known to produce packing rings comprising a plurality of sections in such a way that each one of the ring segments (ring halves) has a radial slot or opening of such a width that it is possible to press the ring for instance over the piston rod of a double-acting engine without exposing the ring material to abnormally high bending stresses. The opening in each one of the ring segments is filled with a correspondingly shaped shoulder on the opposite ring segment.

Practice has proved that the continued development in the field of engine-construction, because of the more and more increased gas pressure in the cylinder and the increased number of revolutions, require the piston rings to be forced with an increased pressure outwards against the cylinder wall. Because of the elastic qualities of the material of the piston rings, such an increased outwardly forcing pressure can only be obtained by increasing the radial thickness of the rings. However, if the ring is to be forced over the piston, the usable radial thickness or the relation between the outer diameter of the ring and the radial thickness of the same is limited by the strength qualities of the material. Thus, the chosen material decides the upper limit for the radial thickness of the ring.

The present invention relates to a packing ring, particularly a piston ring, which is composed of two superposed ring halves adapted to be assembled in a common ring notch. These ring halves are both on one of their side surfaces provided with elevated portions or elevated portions and grooves engaging corresponding grooves or grooves and elevated portions, respectively, in the adjacent side surface of the other ring half and vice versa, whereby an internally and externally circular ring with gastight joints is formed which ring is limited by two plane and parallel side surfaces or by two conical side surfaces or by one conical and one plane side surface. The main feature of the invention is that the free ends situated on both sides of the opening in one of the ring halves engage in a portion of the other ring half, said portion being situated diametrically opposite said opening, the engagement being caused by the coaction of said elevated portions and grooves in such a way that said ends cannot spring in relation to the other ring half neither outwards nor inwards but are free to move peripherally in relation to said other ring half to some extent, whereas the opening in each one of the ring halves, when the ring is assembled and inserted in its notch, is filled by a correspondingly elevated portion on the back of the ring, i.e. a portion situated opposite the opening in the other ring half, said elevated portion extending over a center angle from 10° to almost 180°, preferably between 50° and 90°.

The invention will in the following be elucidated with reference had to accompanying drawings which essentially show two different embodiments of composed packing rings according to the invention.

In the drawings:

Fig. 3 is a plan view of the composed ring, whereas the lower ring half is shown with unbroken lines and the upper ring half is shown with dash and dot lines.

Fig. 4 shows on an enlarged scale a vertical section of the composed ring on the line IV—IV in Fig. 3.

Fig. 7 is a plan view of the composed ring shown in Figs. 5 and 6, whereas the lower ring half is shown with unbroken lines and the upper ring half is shown with dash and dot lines.

Fig. 8 shows on an enlarged scale a vertical section through the composed ring on the line VIII—VIII in Fig. 7.

Fig. 9 is a perspective view of a portion of the composed ring, the upper ring half of the same being provided with a sloped or rounded border.

Fig. 10 is a perspective view from above of the back portion of the lower ring half shown in Fig. 2 but provided with a border slope at the back portion.

Fig. 11 shows a cross section through the ring half on the line XI—XI in Fig. 10.

Fig. 12 is a similar perspective view of the lower ring half according to Fig. 6 but according to a somewhat varied embodiment.

Fig. 13 shows a vertical cross section through the ring half on the line XIII—XIII in Fig. 12.

Fig. 14 is a perspective view from inside of the back portion of the upper ring half according to Fig. 5 but provided with an internal groove and Fig. 15 shows a vertical cross section through the ring half on the line XV—XV in Fig. 14.

Figure 1:
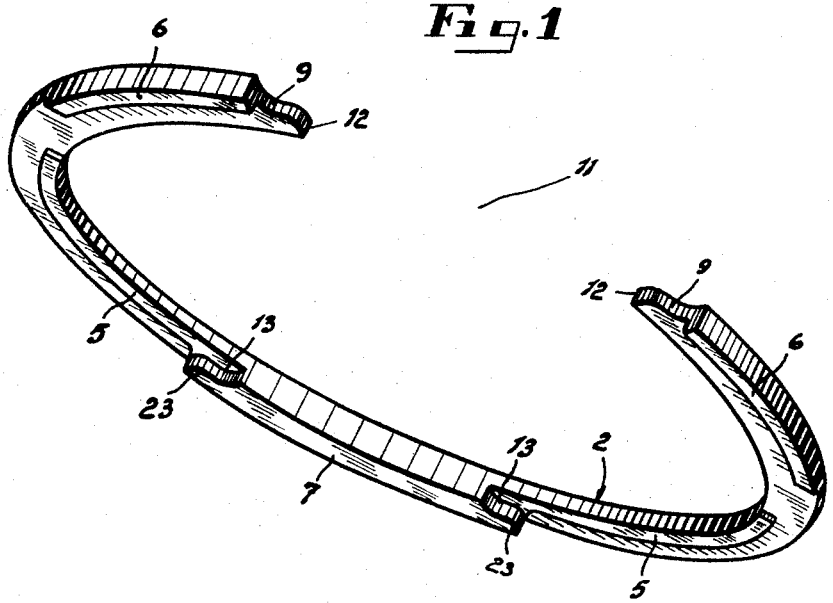
Fig. 1 is a perspective view of the upper ring half viewed obliquely from below.
Figure 2:
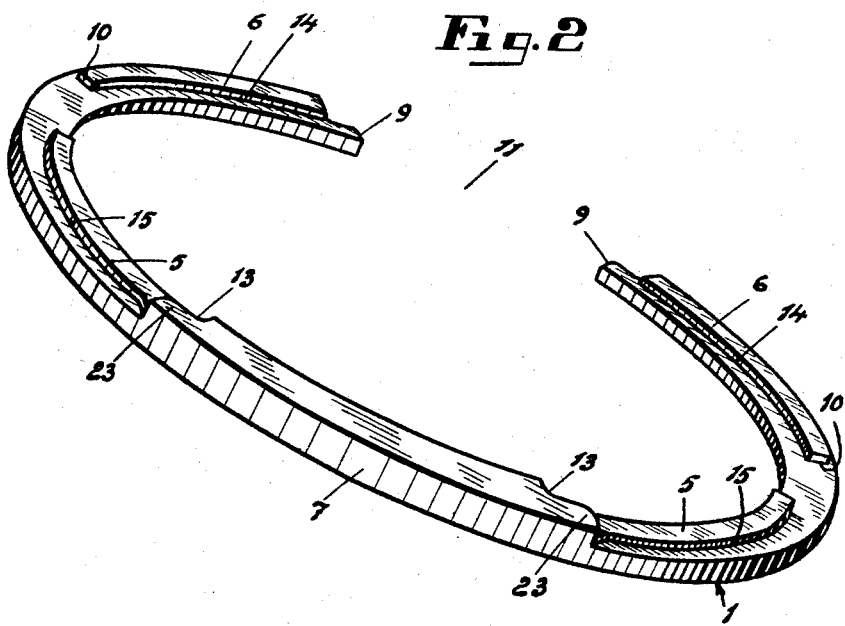
Fig. 2 is a perspective view of the lower ring half viewed obliquely from above, said two ring halves making together a packing ring according to the invention.

The packing ring according to Figs. 1–4 comprises two equally shaped ring halves 1 and 2 which, when they are assembled (Fig. 4), have their plane side surfaces 3 and 4 turned from each other. Peripheral ribs 5 and 6 and a shoulder 7 are arranged on opposite sides of the ring halves at the back portion of the same. The ribs 5 extend from the shoulder 7 along the inner circumference of the ring halves in the direction towards the lateral centre line 8 of the composed ring (Fig. 3) and the ribs 6 are situated at the outer circumference of the ring halves and extend from the ends 9 of the ring half towards said lateral centre line 8. The end 10 of the ribs 6 is, however, situated at a considerable distance from the central line 8. The opening (the slot) 11 between the ends 9 of the ring halves has a centre angle V which, when the ring is assembled, can vary between 10° and almost 180°. These extreme values will, however, probably never be used. The most suitable centre angle lies between 50° and 90°. The ends 9 have internal tongues 12, which engage in corresponding notches 13 at the ends of the shoulder 7 of the opposite ring half, said shoulder, when the ring is assembled, filling the opening 11 in the opposite ring half except for a small peripheral space. The radially inner border 14 of the ribs 6 and the radially outer border 15 of the ribs 5 are shaped as an arc of a circle but their radii 17 and 18 have different centre points 19 and 20 which do not coincide with the centre point 21 of the inner and outer radii of the ring halves. The ribs 5 and 6 are shaped in such a way that, when the ring halves are assembled, the ribs 5 of the upper ring half at their portion 22 adjacent the shoulder 7 press against the outer end of the ribs 6 of the lower ring half 1, whereas the tongues 12 of the lower ring half are pressed outwards against their respective projections 23 at the ends of the shoulder 7 of the upper ring half 2. The ends 9 of the upper ring half 2 are engaged in a similar way between the projections 23 on the shoulder 7 of the lower ring half 1 and the ribs 5 of this ring half. The ends 9 of the ring halves 1 and 2 can thus spring neither radially outwards nor radially inwards. The ring halves can, however, spring in the direction of the centre line 8 (Fig. 3) and due to the fact that the branches of the ring halves 1 and 2 can radially move because of the peripheral sliding of the tongues 12 between the ribs 5 and the projections 23, the ring halves can spring in a plane perpendicular to the centre line 8, i.e. the back portions of the ring halves are also pressed radially outwards against the cylinder wall. It is obvious from Fig. 3 that there is a certain peripheral space between the ends 9 of one of the ring halves and the shoulder 7 of the other ring half as well as between the ribs 5 of one of the ring halves and the corresponding ribs of the other ring half. There is also a radial space between the ribs 5 and 6 of one of the ring halves and the corresponding ribs of the other ring half which space is widest at the center line 8.

Figure 5:
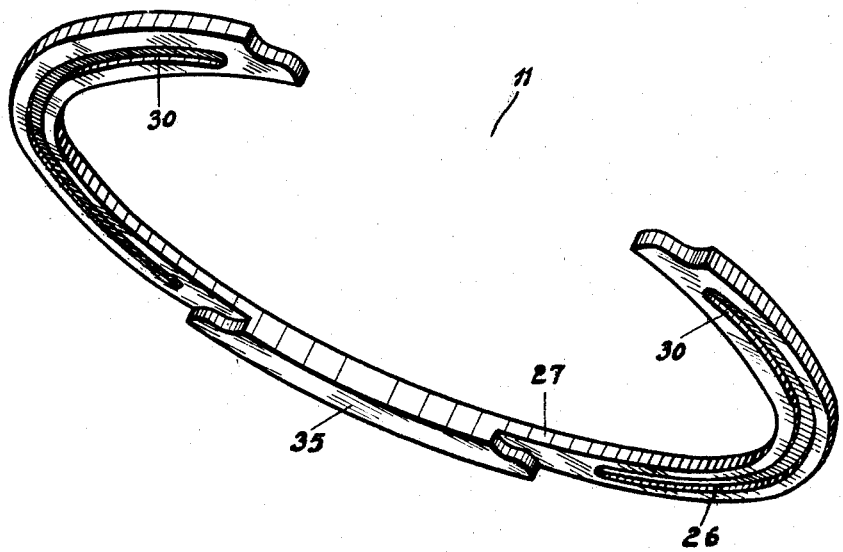
Fig. 5 is a perspective view of the upper ring half viewed obliquely from below and Fig. 6 is a perspective view of the lower ring half viewed obliquely from above, the two ring halves shown in Figs. 5 and 6 forming together another embodiment of the packing ring according to the invention.
Figure 6:
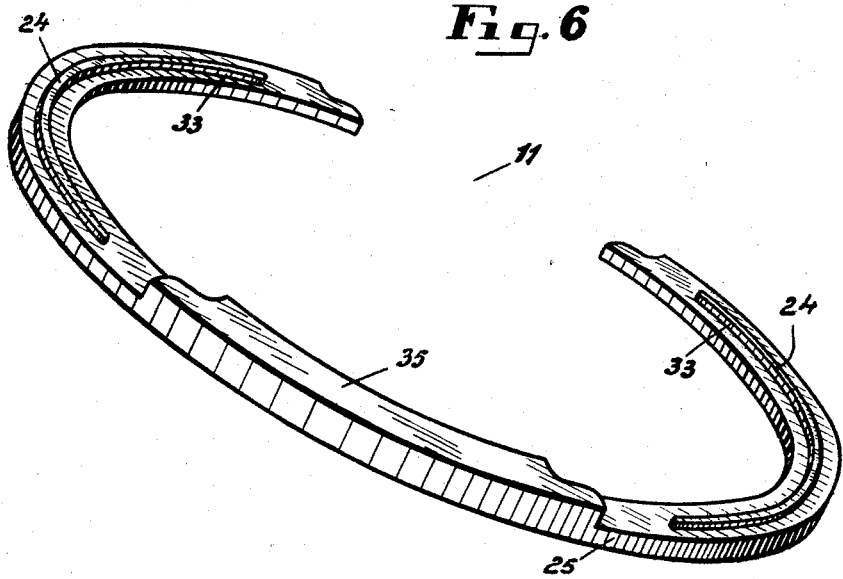

The form of the rings according to Figs. 1–4 corresponds in principle with the form of the rings according to Figs. 5–8. The ribs 5 and 6 according to the first mentioned embodiment are, however, replaced by two ribs 24 on the lower ring 25 which ribs 24 engage in corresponding grooves 26 in the upper ring 27. The lower ring 25 of this embodiment is thus not exactly like the upper ring 27. The ribs 24 and the grooves 26 are shaped as circle arcs but their radii do not correspond with each other. The center point 28 for the radius 29 to the inner wall 30 of the groove 26 corresponds with the center point for the inner and the outer radii of the ring halves but the center point 31 for the radius 32 to the inner wall 33 of the rib 24 is situated at some distance from the center point 28. The eccentricity between the rib 24 and the grooves 26 is of such a kind that, when the ring halves 25 and 27 are assembled (Fig. 7), the inner wall 30 of the groove 26 presses outwards against the radially inner wall 33 of the ribs 24 at the outer ends of the branches of the lower ring 25. The projections 34 of the shoulder 35 prevent simultaneously said ends of the branches to spring radially outwards. Also the ends of the upper ring half 27 are radially kept in a similar way by the projections 34 of the shoulder 35 on the lower ring half 25. Due to the radial space between the ribs 24 and their respective grooves 26, the ring halves are free to spring in the direction of the centre line 8 and due to the peripheral space between the ribs 24 and the grooves 26 as well as between the ends of the branches of the ring halves and the shoulders 35, the ring halves can also spring in a direction perpendicular to the centre line 8 in the plane of the ring halves.

In order to avoid that the ring halves adjacent the shoulders 7 and 35, respectively, will be too rigid, it is recommended to provide notches in them. Such notches can be provided in many different ways. According to Figs. 12 and 13, a peripheral notch 36 is provided in the outer side of each one of the ring halves, whereas the notch is deepest at the middle of the shoulder 35. There could also be provided a second notch 37 in said shoulder 35 which notch 37 extends parallel with the groove 36.

A similar notch 38 is according to Fig. 14 arranged on the inside of the shoulder 35. Also this notch 38 runs in such a way that it is deepest at the middle of the shoulder 35.

The ring half 1 is according to Fig. 10 at the side situated opposite the shoulder 7 provided with a slope 39 which has its greatest value at the middle of the shoulder 35. Due to this slope 39, the disposition of the ring half to be distorted is decreased when the ring half is pressed over the piston.

As obvious from Fig. 9 the ring halves, if necessary, can also at their ends be sloped or rounded at 40 at the border of the ring, whereby the ends are prevented from springing into the gates for fuel intake and outlet in the wall of the cylinder if the rings, after having been used for a long time, are somewhat worn.

The invention involves inter alia the following advantages:

(a) Due to the rather large opening 11 between the ends 9 of the ring halves, the mounting of the rings is facilitated even when the radial thickness of the rings is considerable. The material in the rings is not exposed to any unnormal bending load when the ring halves are pressed over the piston rod.

(b) In fixed position the ends 9 on each one of the ring halves are prevented from springing radially outwards because of the stresses in the material of the rings and also from being pressed radially inwards in the ring groove of the piston by the existing gas pressure.

(c) Oscillations which eventually occur during working, be it oscillations in the plane of the rings or be it oscillations perpendicular to this plane, are effectively smothered and sometimes completely eliminated by the cooperation of the two ring halves, the oscillation conditions of these ring halves being completely different at the opposed situated cross sections. There is thus no risk for the ring to be broken because of oscillations.

The rings can be manufactured of alloyed or not alloyed cast iron adapted for piston rings, of cast iron with spherical graphite or of steel of a corresponding quality. The ring halves can be manufactured from rectangular blanks which one at a time are manufactured by casting. The blanks can be cut off from cylinder-shaped, cast blanks, and the blanks can finally also be obtained by forging. The following machining may thereupon be prosecuted in a way known per se by turning and milling in special machine tools. In all the above-mentioned cases the sliding surface may be hard-chrome-plated, hard-nickel-plated or aluminiumated. Also other pe se previously known processes may be used in order to increase the resistance of the rings.

The shown and described embodiments are to be regarded only as examples, and the shape of the rings and the devices for the radial keeping of the ends of the rings may be varied in many ways within the scope of the invention. Common for all of the embodiments is, however, that the opening between the ends of the rings is made so large that, when using a chosen radial thickness of the rings, the stresses, occurring when the rings are pressed over the piston rod, do not exceed the ones allowable for the material in question.

In the above, the rings have been described for packing against an external gas pressure. They may, however, be shaped and used for packing against an internally acting gas pressure as well.

The invention claimed is:

1. Self-clamping, axially superposed split packing rings, particularly piston rings for internal combustion engines, comprising two ring halves, in which one side surface of said ring halves is provided with elevated portions on the side surface adjacent the other ring half and in which free ends of the ring situated on both sides of an opening of said ring halves engage in a portion of the other ring half situated diametrically opposite said opening, said engagement being caused by the action of said elevated portions in such a way that said ring ends cannot radially spring in relation to the other ring half, neither outwards nor inwards, but said ring ends being free to move in relation to said other ring half to some extent, and in which, when the ring is assembled and fixed, said opening in each one of the ring halves is filled of a correspondingly elevated portion (shoulder) at the back of the ring, i.e. a portion situated diametrically opposite said opening of the other of said rings, said last mentioned elevated portion extending over a centre angle of 10° to 180°, preferably being between 50° and 90°.

2. Self-clamping, axially superposed split packing rings, particularly piston rings for internal combustion engines, comprising two ring halves, in which one side surface of said ring halves is provided with elevated portions on the side surface adjacent the other ring half and in which free ends of the ring situated on both sides of an opening of said ring halves engage in a portion of the other ring half situated diametrically opposite said opening, said engagement being caused by the action of said elevated portions in such a way that said ring ends cannot radially spring in relation to the other ring half, neither outwards nor inwards, but said ring ends being free to move in relation to said other ring half to some extent, and in which, when the ring is assembled and fixed, said opening in each one of the ring halves is filled of a correspondingly elevated portion (shoulder) at the back of the ring, i.e. a portion situated diametrically opposite said opening of the other of said rings, said last mentioned elevated portion extending over a centre angle of 10° to 180°, preferably being between 50° and 90°, the means for retaining said ends of the rings in a desired, radial position comprising ribs arranged concentrically in relation to the outer circumference of the ring halves on one of the ring halves and corresponding ribs on the other ring half.

3. Self-clamping, axially superposed packing rings, particularly piston rings for internal combustion engines, comprising two ring halves, in which one side surface of said ring halves is provided with elevated portions or with elevated portions and grooves on the side surface adjacent the other ring half and in which free ends of the ring situated on both sides of an opening of said ring halves engage in a portion of the other ring half situated diametrically opposite said opening, said engagement being caused by the action of said elevated portions and grooves in such a way that said ring ends cannot radially spring in relation to the other ring half, neither outwardly nor inwardly, but said ring ends being free to move in relation to said other ring half to some extent, and in which, when the ring is assembled and fixed, said opening in each one of the ring halves is filled by a correspondingly elevated portion at the back of the ring, consisting of a portion situated diametrically opposite the said opening of the other of said rings, said last mentioned elevated portion extending over a center angle of 10° to 180°, preferably being between 50° and 180°, the means for retaining said ends of the rings in a desired, radial position comprising ribs arranged concentrically in relation to the outer circumference of the ring halves on one of the ring halves and corresponding ribs on the other ring half, said ribs on one of the ring halves and the corresponding ribs on the other ring half being arranged in such a way that, when the ring is assembled, a space formed between said ribs is largest in a direction perpendicular to a line extending through the center of said opening in the ring halves and decreases in both its directions.

4. Self-clamping, axially superposed split packing rings, particularly piston rings for internal combustion engines, comprising two ring halves, in which one side surface of said ring halves is provided with elevated portions on the side surface adjacent the other ring half and in which free ends of the ring situated on both sides of an opening of said ring halves engage in a portion of the other ring half situated diametrically opposite said opening, said engagement being caused by the action of said elevated portions in such a way that said ring ends cannot radially spring in relation to the other ring half, neither outwards nor inwards, but said ring ends being free to move in relation to said other ring half to some extent, and in which, when the ring is assembled and fixed, said opening in each one of the ring halves is filled of a correspondingly elevated portion (shoulder) at the back of the ring, i.e. a portion situated diametrically opposite said opening of the other of said rings, said last mentioned elevated portion extending over a centre angle of 10° to 180°, preferably being between 50° and 90°, the back portion of the ring halves, i.e. the portion situated opposite said opening in the ring halves, being provided with one or several, peripherally extending notches.

5. Self clamping, axially superposed split packing rings, particularly piston rings for internal combustion engines, comprising two ring halves, in which one side surface of said ring halves is provided with elevated portions on the side surface adjacent the other ring half and in which free ends of the ring situated on both sides of an opening of said ring halves engage in a portion of the other ring half situated diametrically opposite said opening, said engagement being caused by the action of said elevated portions in such a way that said ring ends cannot radially spring in relation to the other ring half, neither outwards nor inwards, but said ring ends being free to move in relation to said other ring half to some extent, and in which, when the ring is assembled and fixed, said opening in each one of the ring halves is filled of a correspondingly elevated portion (shoulder) at the back of the ring, i.e. a portion situated diametrically opposite said opening of the other of said rings, said last mentioned elevated portion extending over a centre angle of 10° to 180°, preferably being between 50° and 90°, the means for retaining said ends of the rings in a desired, radial position comprising ribs arranged concentrically in relation to the outer circumference of the ring halves on one of the ring halves and corresponding ribs on the other ring half, the ring halves being at their back portion provided with a slope at the border situated opposite the border provided with said ribs.

6. Self-clamping, axially superposed split packing rings, especially piston rings for internal combustion engines, comprising two ring halves, in which one side surface of said ring halves is provided with elevated portions and grooves on the side surface adjacent the other ring half and in which free ends of the ring situated on both sides of an opening of said ring halves engage in a portion of the other ring half situated diametrically opposite said opening, said engagement being caused by the action of said elevated portions and grooves in such a way that said ring ends cannot radially spring in relation to the other ring half, neither outwards nor inwards, but said ring ends being free to move in relation to said other ring half a limited distance, and in which, when the ring is assembled and fixed, said opening in each one of the ring halves is filled with a correspondingly elevated portion at the back of the ring, said portion being situated diametrically opposite said opening of the other of said rings, the last mentioned elevated portion extending over a center angle of 10° to 180°, preferably being between 50° and 90°.

7. Self-clamping, axially superposed split packing rings, of piston rings characteristic for internal combustion engines, comprising two ring halves, in which one side surface of said ring halves is provided with elevated portions and grooves on the side surface adjacent the other ring and in which free ends of the ring situated on both sides of an opening of said ring halves engage in a portion of the other ring half situated diametrically opposite said opening, said engagement being caused by the action of said elevated portions and grooves in such a way that said ring ends cannot radially spring in relation to the other ring half, neither outwards nor inwards, but said ring ends being free to move in relation to said other ring half a limited distance, and in which, when the ring is assembled and fixed, said opening in each one of the ring halves is filled with a correspondingly elevated shoulder portion at the back of the ring, said portion being situated diametrically opposite said opening of the other of said rings, said last mentioned elevated portion extending over a center angle of 10° to 180°, preferably between 50° and 90°, the means for retaining said ends of the rings in a radial position comprising ribs situated concentrically on one of the ring halves and engaging in eccentrical grooves in the other ring half, the space by the eccentricity between said ribs and said grooves decreasing in the direction towards said opening of the ring.

8. Self-clamping, axially superposed split packing rings, for internal combustion engines, comprising two ring halves, in which one side surface of said ring halves is provided with elevated portions and grooves on the side surface adjacent the other ring half and in which free ends of the ring situated on both sides of an opening of said ring halves engage in a portion of the other ring half situated diametrically opposite said opening, said engagement being caused by the action of said elevated portions and grooves in such a way that said ring ends cannot radially spring in relation to the other ring half, neither outwards nor inwards, but said ring ends being free to move in relation to said other ring half a limited distance, and in which, when the ring is assembled and fixed, said opening in each one of the ring halves is filled with a correspondingly elevated shoulder portion at the back of the ring, said shoulder portion being situated diametrically opposite said opening of the other of said rings, said last mentioned elevated portion extending over a center angle of 10° to 180°, preferably being between 50° and 90°, means for retaining said ends of the rings in a desired, radial position comprising ribs situated concentrically on one of the ring halves and engaging in eccentrical grooves in the other ring half, the space obtained by the eccentricity between said ribs and said grooves decreasing in the direction towards said opening of the ring, said ribs on one of the ring halves and the corresponding grooves in the other ring half being arranged in such a way that, when the ring is assembled, the space is largest in a direction perpendicular to a line extending through the center of said opening in the ring halves and decreases in both directions.

9. Self-clamping, axially superposed split packing rings, especially piston rings for internal combustion engines, comprising two ring halves, in which one side surface of said ring halves is provided with elevated portions and grooves on the side surface adjacent the other ring half and in which free ends of the ring situated on both sides of the opening of said ring halves engage in a portion of another ring half siuated diametrically opposite said opening, said engagement being caused by the action of said elevated portions and grooves in such a way that said ring ends cannot radially spring in relation to the other ring half, neither outwards nor inwards, but said ring ends being free to move in relation to said other ring half to some extent, and in which, when the ring is assembled and fixed, said opening in each one of the ring halves is filled with a correspondingly elevated portion at the back of the ring, said portion being situated diametrically opposite said opening of the other of said rings, said last mentioned elevated portion extending over a center angle of 10° to 180°, preferably between 50° and 90°, the back portion of the ring halves situated opposite said opening in the ring halves, being provided with one or several, peripherally extending notches.

10. Self-clamping, axially superposed split packing rings, especially piston rings, for internal combustion engines, comprising two ring halves, in which one side surface of said ring halves is provided with elevated portions and grooves on the side surface adjacent the other ring half and in which free ends of the ring situated on both sides of an opening of said ring halves engage in a portion of the other ring half situated diametrically opposite said opening, said engagement being caused by the action of said elevated portions and grooves in such a way that said ring ends cannot radially spring in relation to the other ring half, neither outwards nor inwards, but said ring ends being free to move in relation to said other ring half to some extent, and in which, when the ring is assembled and fixed, said opening in each one of the ring halves is filled with a correspondingly elevated portion at the back of the ring, said portion being situated diametrically opposite said opening of the other of said rings, said last mentioned elevated portion extending over a center angle of 10° to 180°, preferably being between 50° and 90°, means for retaining said end of the rings in a radial position comprising ribs situated concentrically on one of the ring halves and engaging in eccentrical grooves in the other ring half, the space obtained by the eccentricity between said ribs and said grooves decreasing in the direction towards said opening of the ring, the ring halves being at their back portion provided with a slope at the border situated opposite the border provided with said ribs.

References Cited in the file of this patent

UNITED STATES PATENTS

| | | |
|---|---|---|
| 2,047,590 | Madsen | July 14, 1936 |
| 2,055,153 | Madsen | Sept. 22, 1936 |
| 2,209,925 | Mason | July 30, 1940 |
| 2,303,722 | Carlton | Dec. 1, 1942 |